United States Patent Office 3,184,427
Patented May 18, 1965

3,184,427
METHOD FOR CURING ROOM-TEMPERATURE-VULCANIZING ORGANOPOLYSILOXANE RUBBER
James R. Russell and Edward Sweet, Midland, Mich., assignors to Dow Corning Corporation, Midland, Mich., a corporation of Michigan
No Drawing. Filed Aug. 22, 1962, Ser. No. 218,497
20 Claims. (Cl. 260—37)

This invention relates to a method for curing room-temperature-vulcanizing organopolysiloxane rubber in relatively deep sections and to the heat stable compositions so formed.

In the field of silicone rubber, based primarily on diorganopolysiloxanes, much work has been done in developing rubbers which vulcanize and cure at room temperature by the interaction of chosen ingredients. One of these systems employs diorganopolysiloxanes endblocked with silicon-bonded oxime radicals. This system is disclosed in the copending application of Edward Sweet, Serial No. 132,555, filed August 21, 1961, now abandoned, entitled "Silicone Intermediates," which is hereby incorporated by reference. One of the advantages of this particular system is the fact that the product adheres well to any surface in contact during the cure. However, this system does not cure well in thick or deep section, i.e., films thicker than about ¼ inch, or in confined spaces. Another disadvantage of this system is its poor heat stability when cured in semi-confined spaces, i.e., poor confined heat stability.

One of the objects of this invention is to provide a room temperature curing system similar to that identified above which will cure satisfactorily in deep section or in confined spaces. Another object of this invention is to provide such a system which has improved confined heat stability over similar previously known systems. A third object of this invention is to provide a system having the above advantages without sacrificing the excellent bonding properties which are characteristic of the oxime system. These objects are satisfied by this invention.

This invention resides in a method comprising reacting (A) a hydroxy-endblocked siloxane composed of units of the formula $$R'_aSiO_{\frac{4-a}{2}}$$

(B) a silane of the formula $R'_bSi(ON=X)_{4-b}$ in an amount such that there is at least one $ON=X$ radical per silicon-bonded hydroxyl group in siloxane (A), (C) a carboxylic acid anhydride of the general formula AcOAc in an amount such that there are at least .66 mol of the carboxylic acid anhydride per $ON=X$ radical in the silane (B) and (D) magnesium oxide in an amount such that there is at least .33 mol of oxide (D) per $ON=X$ radical in the silane (B), in which components X is selected from the group consisting of radicals of the formula $R_2C=$ and

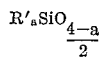

in which each R" is selected from the group consisting of divalent hydrocarbon radicals and halogenated divalent hydrocarbon radicals, each R being a radical selected independently from the group consisting of monovalent hydrocarbon radicals and halogenated monovalent hydrocarbon radicals each R' is a substituent selected independently from the group consisting of R radicals, cyanoalkyl radicals and hydrogen atoms, $a$ has a value of from 1.9 to 2.1 inclusive, $b$ has a value of from 0 to 1 inclusive and Ac is a saturated aliphatic monoacyl radical derived from a carboxylic acid of at least 2 carbon atoms.

The operative silanes are of the general formula $R'_bSi(ON=X)_{4-b}$. The subscript $b$ has a value of from 0 to 1 inclusive. Thus, these silanes include $$R'Si(ON=X)_3$$

and $Si(ON=X)_4$. The method for preparing these oxime silanes is disclosed in the copending Sweet application. This method generally involves the reaction of an oxime with a halogenosilane in the presence of an acid acceptor.

For the purpose of this invention X is either a radical of the formula $R_2C=$ or

R" can be any divalent hydrocarbon radical or divalent halohydrocarbon radical in which the two valences are attached to the C of the $C=NO-$ group. Thus, for example, R" can be

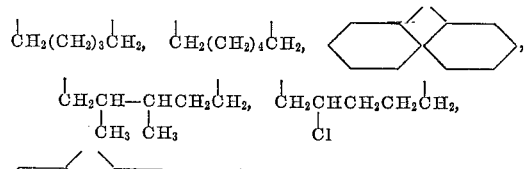

and

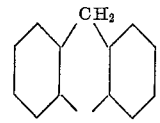

R and R' can be any monovalent hydrocarbon radical or any halogenated monovalent hydrocarbon radical. More specifically R and R' can be, for example, any alkyl radical such as the methyl, ethyl, isopropyl, tert-butyl, 2-ethylhexyl, dodecyl, 1-isobutyl-3,5-dimethylhexyl, octadecyl and myricyl radicals; any alkenyl radical such as the vinyl, allyl, decenyl and hexadienyl radicals; any cycloalkyl radical such as the cyclopentyl and cyclohexyl radicals; any cycloalkenyl radical such as the cyclopentenyl, cyclohexenyl and cyclo-2,4-hexadienyl radicals; any aryl radical such as the phenyl, naphthyl and xenyl radicals; any aralkyl radical such as the benzyl, phenylethyl and xylyl radicals and any alkaryl radical such as the tolyl and dimethylphenyl radicals. These monovalent hydrocarbon radicals can be halogenated to give such radicals as the chloromethyl, 3,3,3 - trifluoropropyl, 3,3,4,4,5,5,5 - heptafluoropentyl, perchlorophenyl, 3,4-dibromocyclohexyl, α, α,α-trifluorotolyl, 2,4-dibromobenzyl, difluoromonochlorovinyl, α,β,β-trifluoro-α-chlorocyclobutyl and 2-idocyclopenten-3-yl radicals, all of which are operative.

In addition, R' can be any cyanoalkyl radical such as the beta-cyanoethyl, gamma-cyanopropyl, omega-cyanobutyl, beta-cyanopropyl, gamma-cyanobutyl and omega-cyanooctadecyl radicals. When cyanoalkyl radicals are present, it is preferred that they be attached to at least 1 mol percent of the silicon atoms in the compounds of this invention. Silanes of the formula $R'Si(ON=X)_3$ are preferred.

It is preferred that X is a $R_2C=$ radical and that R and R' are monovalent hydrocarbon radicals. Aliphatic hydrocarbon radicals of from 1 to 6 inclusive carbon atoms are the preferred monovalent hydrocarbon radicals. The preferred $R_2C=NO-$ radical is $(CH_3CH_2)(CH_3)C=NO-$. The silane of the formula $$(CH_2=CH)Si[ON=C(CH_3)(CH_2CH_3)]_3$$

is preferred.

The hydroxy-endblocked siloxane reactant is composed of units of the formula $$R'_aSiO_{\frac{4-a}{2}}$$

The polymer size of this hydroxy-endblocked siloxane can vary from thin fluids (e.g., where there are five $$R'_aSiO_{\frac{4-a}{2}}$$

units) to non-flowing gums (e.g., where there are 10,000 or more $$R'_aSiO_{\frac{4-a}{2}}$$

units). For the purpose of this invention, mixtures of hydroxy-endblocked siloxanes can be employed which contain molecular species of varying numbers of $$R'_aSiO_{\frac{4-a}{2}}$$

units. Various types of R' groups, which have been defined above, can appear in any one molecule. The siloxane can be a homopolymer or it can be a copolymer of two or more different siloxane units. Mixtures of two or more hydroxy-endblocked silanes can be employed. Often in actual commercial operation the siloxane employed will be a mixture of several molecular species of varying molecular weights. A pure species where some of the molecules have the same degree of polymerization can also be used. It is also preferred that the R' groups in the hydroxy-endblocked siloxane be a monovalent hydrocarbon radical with the preferred monovalent hydrocarbon radicals being aliphatic hydrocarbon radicals of from 1 to 6 inclusive carbon atoms. The subscript $a$ has a value of from 1.9 to 2.1 inclusive.

While this invention involves primarily the reaction of a hydroxy-endblocked diorganosiloxane (A), an oximesilane (B), a carboxylic acid anhydride (C) and magnesium oxide (D), the invention involves modifications of this reaction. One such modification involves the substitution of an oxime-endblocked diorganosiloxane for the oximesilane (B). This oxime-endblocked diorganosiloxane is of the general formula $$(X=NO)_cSiR'_bO[SiR_2O]_nSiR'_b(ON=X)_c$$

The subscript $n$ has a value of at least 5. This siloxane is a thin fluid when $n$ has a value of 5 and is a gum when $n$ has a value of 10,000 or more. The subscript $c$ has a value of from 2 to 3 inclusive and $b$ has a value of from 0 to 1 and the sum of $c+b$ is 3. It is preferred that $c$ have a value of 2. For the purpose of this invention, the X and R' radicals and their preferred definitions are the same as set forth above for the reaction of the oximesilane (B) and the hydroxy-endblocked siloxane (A). This oxime-endblocked siloxane can be produced by the reaction of the hydroxy-endblocked diorganopolysiloxane (A) and the oximesilane (B).

Another modification involves the substitution of an oxime-containing diorganosiloxane for both the hydroxy-endblocked diorganosiloxane (A) and the oximesilane (B). This oxime-containing diorganosiloxane consists essentially of at least 2 units of the general formula $$(X=NO)_cSiR'_bO_{\frac{4-b}{2}}$$

with any other units in said siloxane having the general formula $R'_aSiO$. For the purpose of this invention, X, R', R and their preferred definitions are the same as set forth above for the reaction of the oximesilane (B) and the hydroxy-endblocked diorganosiloxane (A). The subscripts $a$, $b$ and $c$ have the values stated above. The sum of $b+c$ is 3. Preferably, $b$ is 2. It is essential when this oxime-containing siloxane is used, that the reaction take place in the presence of moisture.

When a hydroxy-endblocked diorganopolysiloxane is used in combination with either an oximesilane or an oxime-endblocked siloxane, it is essential that there be at least .66 mol of the carboxylic acid anhydride per ON=X radical and .33 mol of magnesium oxide per ON=X radical in the composition. When a hydroxy-endblocked siloxane is used in combination with either an oximesilane or an oxime-endblocked siloxane in an amount so that there are more than 1.5 oxime radicals per silicon-bonded hydroxyl radical, it is preferred that the reaction take place in the presence of moisture.

While it is necessary that there be at least one silicon-bonded oxime (ON=X) radical per silicon-bonded hydroxyl radical when a hydroxy-endblocked siloxane is used in combination with either an oximesilane or oxime-endblocked siloxane, it is preferable that there be at least a 100 percent molar excess of oxime radicals. Similarly, while a large molar excess, e.g., a 20 fold excess of silicon-bonded oxime radicals can be present, it is preferable that no more than a 1,000 percent molar excess be present in the initial reactants. It should be understood, however, that the method of this invention is operative with more than 1,000 percent molar excess of silicon-bonded oxime radicals over silicon-bonded hydroxyl radicals in the reactants if desired. It should be pointed out that a ratio of one oxime radical per hydroxyl radical is obtained when .33 mol of the oximesilane R'Si(ON=X)$_3$ is used per mol of silicon-bonded hydroxyl groups in the siloxane. It is preferred that either the oximesilane or oxime-endblocked siloxane be used in approximately equimolar ratio with the hydroxy-endblocked siloxane.

When a hydroxy-endlocked diorganosiloxane is reacted with either an oximesilane or an oxime-endblocked siloxane, it is essential that there be at least .66 mol of carboxylic acid anhydride per ON=X group in the reactants. It is preferred that there be at least 1 mol of the anhydride per ON=X in the reactants. When only the oximesiloxane is used, it is essential that there be at least .66 mol of the carboxylic acid anhydride per oxime radical. The oximesiloxane only cures in the presence of moisture.

The carboxylic acid anhydrides are of the general formula AcOAc wherein Ac is a saturated aliphatic monoacyl radical derived from a carboxylic acid of at least 2 carbon atoms. It is preferred that the Ac radical contain from 2 to 6 inclusive carbon atoms. It is preferable to employ at least a 2 fold excess of the carboxylic acid anhydride to insure even and thorough dispersion of this ingredient in the system. However, a 10 fold excess or more of the anhydride can be employed, if desired, without affecting the cure mechanism of the system. Suitable examples of carboxylic acid anhydrides are acetic anhydride, isobutyric anhydride, hexoic anhydride, 2-ethylhexoic anhydride, octanoic anhydride, stearic anhydride and acetic butyric anhydride. Acetic anhydride is preferred.

In addition to the carboxylic acid anhydride, it is also essential that there be at least .33 mol of magnesium oxide per ON=X radical in the oximesilane when the oximesilane and hydroxy-endblocked siloxanes are reacted. It is preferred that there be .5 mol of magnesium oxide per ON=X radical in the oximesilane (e.g., 1.5 mols of oxide per mol of R'Si(ON=X)$_3$ silane). When the hydroxy-endblocked diorganosiloxane and oxime-endblocked siloxane are reacted, it is necessary that there be at least .33 mol of magnesium oxide per X=NO radical in the reactants. It is preferred that there be at least .5 mol of oxide per X=NO radical. When only the oximesiloxane is used, it is essential that there be .33 mol of oxide per X=NO radical and preferred that there is at least .5 mol of magnesium oxide. It is preferable to employ at least a 2 fold excess of magnesium oxide to insure even and thorough dispersion of this ingredient in the system. It is preferred that there be at least .5 mol of oxide per mol of carboxylic acid anhydride.

The method of this invention operates spontaneously upon the mixing of the named reactants to produce a cured rubber. Temperatures ranging from 15° C. to 100° C. are sufficient although higher or lower temperatures can be employed depending only on the freezing point, boiling point or decomposition temperature of any reactant. The rate of cure can be slowed by increasing the size of the R and R' radicals in the organosilicon compounds, by increasing the size of the oxime radical (ON=X) or by increasing the ratio of silicon-bonded oxime radicals to silicon-bonded hydroxyl radicals. For commercial use the best method for practicing this invention is to prepare two components, one component containing the hydroxy-endblocked siloxane and the oximesilane or oximesiloxane containing the carboxylic acid anhydride. When only the oximesiloxane is used, it is necessary that the carboxylic acid anhydride be mixed with the siloxane just prior to curing. The hydroxy-endblocked diorganosiloxane and oximesilane reactants are preferred.

These components can be co-reacted at elevated temperatures, if desired, or in the presence of condensation catalysts.

Typical classes of such condensation catalysts include, for example, certain organic amines, phosphoric acid salts of any basic amino compound, carboxylic acid salts of any basic amino compound, carboxylic acid salts of any quaternary ammonium hydroxide and carboxylic acid salts of any metal ranging from lead to manganese inclusive in the electromotive series of metals.

The physical properties of the compounds of this invention can be modified by mixing therewith other types of siloxanes and/or fillers. For example, it may be desirable to increase the adhesive qualities of the compounds of this invention by mixing therewith resinous siloxanes. These resinous siloxanes will also modify the elastic properties of the ultimate vulcanized compositions to make them more dough-like and less resilient. Such properties are highly desirable in certain calking applications. It also may be desirable to plasticize the vulcanized compositions of this invention by incorporating therein certain unreactive hydroxyl-free siloxane plasticizing agents such as trimethylsiloxy-endblocked dimethylsiloxanes. Silica fillers are employed in the compositions of this invention in an amount ranging from about 5 to 150 parts by weight based on 100 parts of the hydroxy-endblocked siloxane (A). When only an oximesiloxane is used, silica fillers can be employed in an amount ranging from about 5 to 150 parts by weight based on 100 parts of the oximesiloxane.

The compounds of this invention can also be modified by incorporating therein any of the well-known reinforcing fillers such as fume silicas, silica aerogels and precipitated silicas of high surface area. These fillers, if desired, can have organosilyl groups attached to the surface thereof. The fillers employed herein can also be non-reinforcing fillers such as coarse silicas such as diatomaceous earth, crushed quartz or metallic oxides such as titania, ferric oxide, zinc oxide and the like. If desired, fibrous fillers such as asbestos or glass may also be employed. In short, any of the fillers commonly employed with silicone rubbers may be employed in the compositions of this invention. In all cases it is desirable that the filler be substantially dry before admixing with the composition although some water can be tolerated if an excess of the oximesilane is employed.

The fillers are usually employed to increase the strength of the elastomeric compositions and also to modify the flow characteristics of the uncured composition. The latter is particularly important in calking applications where it is undesirable to have any appreciable flow take place between the time the material is placed in the joint and the time curing occurs.

In addition to the above ingredients the compositions of this invention can contain any other desirable additive such as pigments, sun-screen agents, oxidation inhibitors and dielectric materials such as graphite and carbon black.

The following examples are illustrative and are not intended to limit this invention the scope of which is properly delineated in the claims. All quantitative measurements are in parts by weight. All viscosities were measured at 25° C.

EXAMPLE 1

Sample A was prepared by mixing 100 parts by weight of a 12,500 cs. hydroxyl-endblocked dimethylsiloxane with 40 parts by weight of a 1,000 cs. trimethylsilyl-endblocked dimethylsiloxane, 13 parts by weight of a reinforcing fume silica and 10 parts by weight of $(CH_3)Si[ON=C(CH_3)_2]_3$ (equivalent to 25 —ON=$C(CH_3)_2$ per hydroxyl radical). Sample B was prepared by mixing 100 g. of Sample A with 7.36 g. of acetic anhydride (equivalent to 1 mol of acetic anhydride per —ON=$C(CH_3)_2$ radical) and 1.25 g. of magnesium oxide (equivalent to .5 mol of magnesium oxide per —ON=$C(CH_3)_2$ radical). Each sample was then confined in a small cavity about ½ inch deep and 1 inch in diameter. Each sample was wrapped tightly in 1 mil aluminum foil to exclude atmospheric moisture and was allowed to stand for 24 hours before checking the cure. Sample B was cured to the extent that it has a Shore A durometer of 12 after 24 hours. Sample A was uncured after both 24 hours and 7 days.

EXAMPLE 2

Sample A was prepared by mixing 140 parts by weight of a hydroxyl-containing dimethylsiloxane with a viscosity of about 12,000 cs. with 14 parts by weight of a reinforcing fume silica, 4 parts by weight of a hydroxylendblocked phenylmethylsiloxane fluid and 10 parts by weight of $(CH_2=CH)Si[ON=C(CH_2CH_3)(CH_3)]_3$ (equivalent to more than 1 ON=$C(CH_2CH_3)(CH_3)$ radical per OH group). Sample B was identical with Sample A except that it also contains 7.36 parts by weight acetic anhydride (equivalent to 1 mol anhydride per $ON=C(CH_2CH_3)(CH_3)$ radical) and 1.25 parts by weight magnesium oxide (equivalent to .5 mol oxide per ON=$C(CH_2CH_3)CH_3$ radical). Sample C was identical to Sample B except that it also contains 0.1 part by weight per 100 parts by weight of Sample A dibutyltin dilaurate. Each of these samples was confined in a small cavity about ½ inch deep and 1 inch in diameter. The samples were wrapped tightly in 1 mil aluminum foil to exclude atmospheric moisture and allowed to stand for 24 hours before checking the cure. The cure was also checked after 7 days. The Shore A durometer of each sample is set forth in Table I.

Table I

| Sample | Shore A Durometer | |
|---|---|---|
| | 1 day | 7 days |
| A | 0 | 0 |
| B | 12 | 25 |
| C | 15 | 25 |

EXAMPLE 3

When any of the following silanes are substituted mol per mol for the $(CH_3)Si[ON=C(CH_3)_2]_3$ in Sample B of Example 1 and the procedure of Example 1 is followed, an excellent room temperature vulcanizing rubber which cures well in deep section is obtained:

C₆H₅Si[ON=C(CH₃)₂]₃
C₆H₁₁Si[ON=C(CH₃)₂]₃
C₁₈H₃₇Si[ON=C(CH₃)₂]₃
CH₂=CHSi[ON=C(CH₃)₂]₃
C₆H₅CH₂Si[ON=C(CH₃)₂]₃
BrC₆H₄Si[ON=C(CH₃)₂]₃
Cl₂C₆H₃Si[ON=C(CH₃)₂]₃
CF₃CH₂CH₂Si[ON=C(CH₃)₂]₃
C₃F₇CH₂CH₂Si[ON=C(CH₃)₂]₃
CF₃CH₂CH₂CH(CF₃)CH₂Si[ON=C(CH₃)₂]₃
CF₃C₆H₄Si[ON=C(CH₃)₂]₃
NCCH₂CH₂Si[ON=C(CH₃)₂]₃

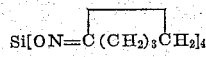

Si[ON=C(C₆H₅)(CH₃)]₄

EXAMPLE 4

When any of the following carboxylic acid anhydrides are substituted mol per mol for the acetic anhydride of Sample B of Example 1 and the procedure of Example 1 is followed, an excellent room temperature vulcanizing rubber which cures well in deep section is obtained.

1—acetic butyric anhydride
2—hexoic anhydride
3—stearic anhydride
4—isobutyric anhydride

EXAMPLE 5

When any of the siloxanes of the following unit formulae are substituted for the (CH₃)Si[ON=C(CH₃)₂]₃ in Sample B of Example 1 in an equimolar ratio with the hydroxyl-endblocked dimethylsiloxane, an excellent room temperature vulcanizing rubber which cures well in deep section is obtained:

[(CH₃)₂C=NO]₂Si(CH₃)O[Si(C₆H₅)
 (CH₃)O]₃₀Si(CH₃)[ON=C(CH₃)₂]₂
[(CH₃)₂C=NO]₂Si(CH₃)O[Si(CH₃)
 (CH₂CH₂CN)O]₁₀[Si(CH₃)₂O]₉₀
 Si(CH₃)[ON=C(CH₃)₂]₂
[(CH₃)₂C=NO]₂Si(CH₃)O[Si(CH₃)
 (CH₂C₆H₅)O]₄[Si(CH₃)(C₁₈H₃₇)O]₁[Si(CH₃)
 (CH₂=CH)O]₂₀Si(CH₃)[ON=C(CH₃)₂]₂
[(CH₃)₂C=NO]₃SiO[Si(CH₃)₂O]₃₀₀
 Si[ON=C(CH₃)₃]₃
[(CH₃)₂C=NO]₂Si(CH₃)O[Si(CH₃)
 (CH₂CH₂CF₂)O]₂₀Si(CH₃)[ON=C(CH₃)₂]₂
[(CH₃)₂C=NO]₂Si(CH₃)O[Si(CH₃)
 (C₆H₃Cl₂)O]₁₀₀Si(CH₃)[ON=C(CH₃)₂]₂

EXAMPLE 6

When 100 parts by weight of any of the siloxanes of the following unit formulae are mixed with 40 parts by weight of a 1,000 cs. trimethylsilyl endblocked dimethylsiloxane, 10 parts by weight of a reinforcing fume silica and sufficient acetic anhydride to provide 1 mol of the anhydride per oxime radical in the siloxane and sufficient magnesium oxide to provide at least .5 mol per oxime radical and a ½ inch deep section of the mixture is allowed to cure in the presence of moisture, a well-cured rubber is obtained:

[(CH₃)₂C=NO]₂Si(CH₃)O[Si(C₆H₅)
 (CH₃)O]₃₀Si(CH₃)[ON=C(CH₃)₂]₂
[(CH₃)₂C=NO]₂Si(CH₃)O[Si(CH₃)(CH₂CH₂CN)O]₁₀
 [Si(CH₃)₂O]₉₀Si(CH₃)[ON=C(CH₃)₂]₂
[(CH₃)₂C=NO]₂Si(CH₃)O[Si(CH₃)(CH₂C₆H₅)O]₄
 [Si(CH₃)(C₁₈H₃₇)O]₁[Si(CH₃)(CH₂=CH)O]₂₀
 Si(CH₃)[ON=C(CH₃)₂]₂
[(CH₃)₂C=NO]₃SiO[Si(CH₃)₂O]₃₀₀Si[ON=C(CH₃)₃]₃

[(CH₃)₂C=NO]₂Si(CH₃)O[Si(CH₃)(CH₂
 CH₂CF₂)O]₂₀Si(CH₃)[ON=C(CH₃)₂]₂
[(CH₃)₂C=NO]₂Si(CH₃)O[Si(CH₃)(C₆H₃
 Cl₂)O]₁₀₀Si(CH₃)[ON=C(CH₃)₂]₂

That which is claimed is:

1. A method comprising reacting (A) a hydroxy-endblocked siloxane composed of units of the formula $$\frac{R'_aSiO_{4-a}}{2}$$

(B) a silane of the formula $R'_bSi(ON=X)_{4-b}$ in an amount such that there is at least one ON=X radical per silicon-bonded hydroxyl group in siloxane (A), (C) a carboxylic acid anhydride of the general formula AcOAc in an amount such that there are at least .66 mol of the carboxylic acid anhydride per ON=X radical in the silane (B) and (D) magnesium oxide in an amount such that there is at least .33 mol of oxide (D) per ON=X radicals in silane (B), in which components X is selected from the group consisting of radicals of the formula $R_2C=$ and

$R''C=$ in which each R" is selected from the group consisting of divalent hydrocarbon radicals and halogenated divalent hydrocarbon radicals, each R being a radical selected independently from the group consisting of monovalent hydrocarbon radicals and halogenated monovalent hydrocarbon radicals, each R' is a substituent selected independently from the group consisting of R radicals, cyanoalkyl radicals and hydrogen atoms, $a$ has a value of from 1.9 to 2.1 inclusive, $b$ has a value of from 0 to 1 inclusive, and Ac is a saturated aliphatic monoacyl radical derived from a carboxylic acid of at least 2 carbon atoms.

2. A method in accordance with claim 1 wherein X is a $R_2C=$ radical, R and R' are monovalent hydrocarbon radicals and each Ac radical has from 2 to 6 inclusive carbon atoms.

3. A method comprising reacting (A) a hydroxyendblocked siloxane composed of units of the formula $$\frac{R'_aSiO_{4-a}}{2}$$

(B) a silane of the formula $R'Si(ON=CR_2)_3$ in an amount such that there is at least 0.33 mol of silane (B) per silicon-bonded hydroxyl group in siloxane (A), (C) a carboxylic acid anhydride of the general formula AcOAc so that there is at least 3 mols of the carboxylic acid anhydride per mol of silane (B) and (D) magnesium oxide in an amount such that there are at least 1.5 mols of oxide (D) per mol of silane (B), in which components R and R' are aliphatic hydrocarbon radicals of from 1 to 6 inclusive carbon atoms, Ac is a saturated aliphatic monoacyl radical derived from a carboxylic acid of from 2 to 6 inclusive carbon atoms and $a$ has value of from 1.9 to 2.1 inclusive.

4. A method comprising reacting (A) a hydroxyendblocked siloxane composed of units of the formula (CH₃)₂SiO, (B) a silane of a formula (CH₂=CH)Si[ON=C(CH₃)(CH₂CH₃)]₃ in an amount such that there is at least 0.33 mol of silane (B) per silicon-bonded hydroxyl group in siloxane (A), (C) acetic anhydride in an amount such that there are at least 3 mols of acetic anhydride per mol of silane (B) and (D) magnesium oxide in an amount such that there are at least 1.5 mols of oxide (D) per mol of silane (B).

5. A composition consisting essentially of the reaction product of (A) a hydroxy-endblocked siloxane composed of units of the formula $$\frac{R'_aSiO_{4-a}}{2}$$

(B) a silane of the formula $R'_bSi(ON=X)_{4-b}$ in an amount such that there is at least one $ON=X$ radical per silicon-bonded hydroxyl group in siloxane (A), (C) a carboxylic acid anhydride of the general formula AcOAc in an amount such that there are at least .66 mol of the carboxylic acid anhydride per $ON=X$ radical in the silane (B) and (D) magnesium oxide in an amount such that there is at least .33 mol of oxide (D) per $ON=X$ radical in silane (B), in which components X is selected from the group consisting of radicals of the formula $R_2C=$ and

in which each R'' is selected from the group consisting of divalent hydrocarbon radicals and halogenated divalent hydrocarbon radicals, each R being a radical selected independently from the group consisting of monovalent hydrocarbon radicals and halogenated monovalent hydrocarbon radicals, each R' is a substituent selected independently from the group consisting of R radicals, cyanoalkyl radicals and hydrogen atoms, $a$ has a value of from 1.9 to 2.1 inclusive, $b$ has a value of from 0 to 1 inclusive and Ac is a saturated aliphatic monoacyl radical derived from carboxylic acid of at least 2 carbon atoms.

6. A composition in accordance with claim 5 wherein X is a $R_2C=$ radical, R and R' are monovalent hydrocarbon radicals and each Ac radical has from 2 to 6 inclusive carbon atoms.

7. A composition consisting essentially of the reaction product of (A) a hydroxy-endblocked siloxane composed of units of the formula $$R'_aSiO_{\frac{4-a}{2}}$$

(B) a silane of the formula $R'Si(ON=CR_2)_3$ in an amount such that there is at least 0.33 mol of silane (B) per silicon-bonded hydroxyl group in siloxane (A), (C) a carboxylic acid anhydride of the general formula AcOAc so that there are at least 3 mols of the carboxylic acid anhydride per mol of silane (B) and (D) magnesium oxide in an amount such that there are at least 1.5 mols of oxide (D) per mol of silane (B), in which components R and R' are aliphatic hydrocarbon radicals of from 1 to 6 inclusive carbon atoms, Ac is a saturated aliphatic monoacyl radical derived from a carboxylic acid of from 2 to 6 inclusive carbon atoms and $a$ has a value of from 1.9 to 2.1 inclusive.

8. A composition consisting essentially of the reaction product of (A) a hydroxy-endblocked siloxane composed of units of the formula $(CH_3)_2SiO$, (B) a silane of the formula $(CH_2=CH)Si[ON=C(CH_3)(CH_2CH_3)]_3$ in an amount such that there is at least 0.33 mol of silane (B) per silicon-bonded hydroxyl group in siloxane (A) and (C) acetic anhydride in an amount such that there are at least 3 mols of acetic anhydride per mol of silane (B) and (D) magnesium oxide in an amount such that there are at least 1.5 mols of oxide (D) per mol of silane (B).

9. The composition of claim 5 with from 5 to 150 parts by weight per 100 parts of (A) of a silica filler.

10. The composition of claim 6 with from 5 to 150 parts by weight per 100 parts of (A) of a silica filler.

11. The composition of claim 7 with from 5 to 150 parts by weight per 100 parts of (A) of a silica filler.

12. The composition of claim 8 with from 5 to 150 parts by weight per 100 parts of (A) of a silica filler.

13. A method comprising reacting in the presence of moisture (A) an uncured siloxane compound, each molecule of which consists essentially of at least 2 units of the general formula

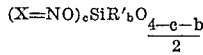

any other units in said siloxane having the general formula $$R'_aSiO_{\frac{4-a}{2}}$$

(B) a carboxylic acid anhydride of the general formula AcOAc in an amount such that there is at least .66 mol of the carboxylic acid anhydride (B) per $X=NO$ radical in (A) and (C) magnesium oxide in an amount such that there is at least .33 mol of oxide (C) per $X=NO$ radical in (A), in which components X is selected from the group consisting of radicals of the formula $R_2C=$ and

in which each R'' is selected from the group consisting of divalent hydrocarbon radicals and halogenated divalent hydrocarbon radicals, each R is a radical selected from the group consisting of monovalent hydrocarbon radicals, each R' is a substituent selected independently from the group consisting of R radicals, cyanolkyl radicals and hydrogen atoms, Ac is a saturated aliphatic monoacyl radical derived from a carboxylic acid of at least 2 carbon atoms, $b$ has a value of from 0 to 1 inclusive, $c$ has a value of from 2 to 3 inclusive and $a$ has a value of from 1.9 to 2.1.

14. The method of claim 13 wherein X is a $R_2C=$ radical, R' and R are monovalent hydrocarbon radicals and Ac has from 2 to 6 carbon atoms.

15. A method comprising reacting in the presence of moisture (A) an uncured siloxane compound, each molecule of which consists essentially of at least 2 units of the general formula $(R_2C=NO)_2SiR'O_{.5}$, any other units in said siloxane having the general formula $R'_2SiO$ (B) a carboxylic acid anhydride of the general formula AcOAc in an amount so that there is at least one mol of the carboxylic acid anhydride (B) per $R_2C=NO$ radical in (A) and (C) magnesium oxide in an amount so that there is at least .5 mol of oxide (C) per $R_2C=NO$ radical in (A), in which components R and R' are aliphatic hydrocarbon radicals of from 1 to 6 inclusive carbon atoms and Ac is a saturated aliphatic monoacyl radical derived from a carboxylic acid of from 2 to 6 inclusive carbon atoms.

16. A method comprising reacting in the presence of moisture (A) an uncured siloxane compound, each molecule of which consists essentially of at least 2 units of the general formula $$(CH_2=CH)[ON=C(CH_3)(CH_2CH_3)]_2SiO_{.5}$$

any other units in said siloxane having the general formula $(CH_3)_2SiO$, (B) acetic anhydride in an amount such that there is at least one mol of acetic anhydride (B) per $(CH_3)_2C=NO$ radical in (A) and (C) magnesium oxide in an amount such that there is at least .5 mol of oxide (C) per $(CH_3)_2C=NO$ radical in (A).

17. A method comprising reacting (A) a hydroxy-endblocked siloxane composed of units of the formula $$R'_aSiO_{\frac{4-a}{2}}$$

(B) a compound of the formula $$(X=NO)_cSiR'_bO[SiR_2O]_nSiR'_b(ON=X)_c$$

in a sufficient amount so that there is at least one $X=NO$ radical per silicon-bonded hydroxyl radical in (A), (C) a carboxylic acid anhydride of the general formula AcOAc in an amount such that there is at least .66 mol of the carboxylic acid anhydride (C) per $X=NO$ radical in (B) and (D) magnesium oxide in an amount such that there is at least .33 mol of oxide (D) per $X=NO$ radical in (B), in which components X is selected from the group consisting of radicals of the formula $R_2C=$ and

in which each $R''$ is selected from the group consisting of divalent hydrocarbon radicals and halogenated divalent hydrocarbon radicals, each R is a radical selected from the group consisting of monovalent hydrocarbon radicals, each $R'$ is a substituent selected independently from the group consisting of R radicals, cyanoalkyl radicals and hydrogen atoms, and Ac is a saturated aliphatic monoacyl radical derived from a carboxylic acid of at least 2 carbon atoms, $n$ is a positive integer of at least 5, $a$ has a value of from 1.9 to 2.1 inclusive, $b$ has a value of from 0 to 1 inclusive, $c$ has a value of from 2 to 3 inclusive and $b+c$ has a value of 3.

18. The method of claim 17 wherein X is a $R_2C=$ radical, $R'$ and R are monovalent hydrocarbon radicals, Ac has from 2 to 6 carbon atoms.

19. A method comprising reacting (A) a hydroxy-endblocked siloxane composed of units of the formula $$R'_aSiO_{\frac{4-a}{2}}$$

(B) a compound of the formula $$(R_2C=NO)_2SiR'O[SiR_2O]_nSiR'(ON=CR_2)_2$$

in an approximately equimolar ratio with (A), (C) a carboxylic acid anhydride of the general formula AcOAc in an amount so that there is at least 1 mol of carboxylic acid anhydride (C) per $R_2C=NO$ radical in (B) and (D) magnesium oxide in an amount so that there is at least .5 mol of oxide (D) per $R_2C=NO$ radical in (B), in which components R and $R'$ are aliphatic hydrocarbon radicals of from 1 to 6 inclusive carbon atoms and Ac is a saturated aliphatic monoacyl radical derived from a carboxylic acid of from 2 to 6 inclusive carbon atoms, $n$ is a positive integer of at least 5 and $a$ has a value of from 1.9 to 2.1 inclusive.

20. A method comprising reacting (A) a hydroxy-endblocked siloxane composed of units of the formula $$R'_aSiO_{\frac{4-a}{2}}$$

(B) a compound of the formula $$[(CH_3CH_2)(CH_3)C=NO]_2Si(CH_2=CH)O$$
$$[Si(CH_3)_2O]_nSi(CH=CH_2)$$
$$[ON=C(CH_3)(CH_2CH_3)]_2$$

in an approximately equimolar ratio with (A), (C) acetic anhydride in an amount such that there is at least 1 mol of acetic anhydride (C) per $(CH_3)_2C=NO$ radical in (B) and (D) magnesium oxide in an amount such that there is at least .5 mol of oxide (D) per $(CH_3)_2C=NO$ radical in (B), in which components $n$ is a positive integer of at least 5 and $a$ has a value of from 1.9 to 2.1 inclusive.

References Cited by the Examiner
UNITED STATES PATENTS 2,938,010  5/60  Bluestein _____ 260—46.5

MURRAY TILLMAN, *Primary Examiner.*

WILLIAM H. SHORT, *Examiner.*